(12) United States Patent
Biggio (10) Patent No.: US 11,448,198 B2
(45) Date of Patent: Sep. 20, 2022

(54) INERTIAL FORCE POLARIZER APPARATUS

(71) Applicant: Eric Winston Biggio, Arlington, VA (US)

(72) Inventor: Eric Winston Biggio, Arlington, VA (US)

(*) Notice: Subject to any disclaimer, the term of this patent is extended or adjusted under 35 U.S.C. 154(b) by 185 days.

(21) Appl. No.: 16/741,714

(22) Filed: Jan. 13, 2020

(65) Prior Publication Data

US 2020/0224644 A1    Jul. 16, 2020

Related U.S. Application Data

(60) Provisional application No. 62/791,419, filed on Jan. 11, 2019.

(51) Int. Cl.
| | |
|---|---|
| *F03G 3/00* | (2006.01) |
| *B64C 27/32* | (2006.01) |
| *B64C 27/00* | (2006.01) |
| *B64C 39/00* | (2006.01) |

(52) U.S. Cl.
CPC ............. *F03G 3/00* (2013.01); *B64C 27/32* (2013.01); *B64C 27/001* (2013.01); *B64C 39/001* (2013.01)

(58) Field of Classification Search
CPC ........ F03G 3/00; B64C 27/001; B64C 39/001; B64C 27/32
See application file for complete search history.

(56) References Cited

U.S. PATENT DOCUMENTS

2019/0152592 A1* 5/2019 Harper .................... B64C 27/20

* cited by examiner

*Primary Examiner* — Joseph Ortega
(74) *Attorney, Agent, or Firm* — Law Office of Jerry Joseph, PLC; Jerry Joseph (57) ABSTRACT

An inertial force polarizer apparatus including a rotor frame member comprising a plurality of rotor nests, a plurality of rotor assemblies rotatably mounted to the rotor frame member, each rotor assembly includes a shaftless rotor having one or more attachment members, and a motor having a rotatable shaft coupled to the one or more attachment members, the motor configured to drive rotation of the shaftless rotor about an axis, wherein a rotation of the shaftless rotor generates an inertia on the rotor frame member.

11 Claims, 14 Drawing Sheets

INERTIAL FORCE POLARIZER APPARATUS

BACKGROUND OF THE INVENTION

1. Field of the Invention

The present general inventive concept relates to an inertial force polarizer, and more particularly, to a polarizer of the inertial force created by the angular momentum built up in a rotating solid object which is then used to generate lift using a gyroscopic effect.

2. Description of Related Art

Many devices have been previously developed that attempt to harness gyroscopic motion and/or precession in order to generate lift. These gyroscopic devices typically include a pair of discs at opposite ends of a rotatable rigid axle which is used to directionalize angular moment. However, the gyro rotation created by these devices fail to generate lift using gyroscopic precession since the discs are rotated about a solid, rigid axle and attempt to pull the devices upward.

Therefore, what is desired is a simple device that polarizes the inertial forces created by angular momentum generated internally of rotors (e.g., flywheels) that are rotated about a non-rigid axle to generate lift using a gyroscopic effect.

SUMMARY OF THE INVENTION

The present general inventive concept provides an inertial force polarizer that is designed and configured to directionalize (polarize) the inertial force created by the angular momentum buildup in a rotating solid object, and to use this force to counter the force of gravity on the apparatus through the use of the gyroscopic effect.

The inertial force polarizer according to the present general inventive concept may be used for propulsion for a wide variety of applications, supplementing or replacing conventional reaction-based propulsion systems.

The inertial force polarizer according to the present general inventive concept may also be used to produce actual directed force. However, the present general inventive concept is not limited thereto.

BRIEF DESCRIPTIONS OF THE DRAWINGS

These and/or other aspects of the present general inventive concept will become apparent and more readily appreciated from the following description of the embodiments, taken in conjunction with the accompanying drawings of which.

DESCRIPTION OF INVENTION

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures, however it will be understood that these embodiments are not intended to limit the present inventive concept to these embodiments alone. Instead, the present general inventive concept disclosed herein is intended to cover alternatives, modifications, and equivalents which may be included within the spirit and scope of the present disclosure as defined by the appended claims.

The inertial force polarizer apparatus according to the present general inventive concept is configured to resolve issues with gyroscopic propulsion by harnessing and polarizing an internally propagated force generated by a rotating solid body (e.g., a rotor or flywheel) acting on the outer surfaces of the body, rather than from a central axle or shaft.

The inertial force polarizer apparatus according to the present general inventive concept is also configured to polarize forces propagated internal to each rotor when rotated using a flexible, non-rigid shaft or axle, into a single direction (e.g., upward direction) thereby generating a polarized force counter to gravitational force.

The inertial force polarizer apparatus according to the present general inventive concept includes a rotor frame that is coupled to the outer surfaces of one or more shaftless rotors using bearings, and one or more motors coupled to inner surfaces of the one or more rotors via an elastic member.

The inertial force polarizer apparatus is manually, magnetically, and/or electronically rotated to create artificial precession, since there would be no precession on shaftless rotors. In other words, since there would be no precession on shaftless rotors or flywheels, artificial precession is initiated when the entire rotor frame of the inertial force polarizer is rotated by various mechanical means, including an electric motor. However, the present general inventive concept is not limited thereto.

In the present embodiment, the artificial precession is created by using an external motor to rotate the entire inertial force polarizer about a vertical central axis A1. As such, the force generated by the one or more shaftless rotors acts on the rotor frame member from the outer surface of the rotors, thereby resulting in a polarized force pushing in an upward direction, counter to a gravitational force.

In the present embodiment, the inertial force polarizer apparatus is designed and configured to generate an inertial force created by the angular momentum built up internally within a rotating solid object, such as a rotor or flywheel, and then to polarize this force, countering gravitational force, to act on the rotor frame member along a single direction (e.g. a vertical direction) through the use of a gyroscopic effect.

Figure 1:
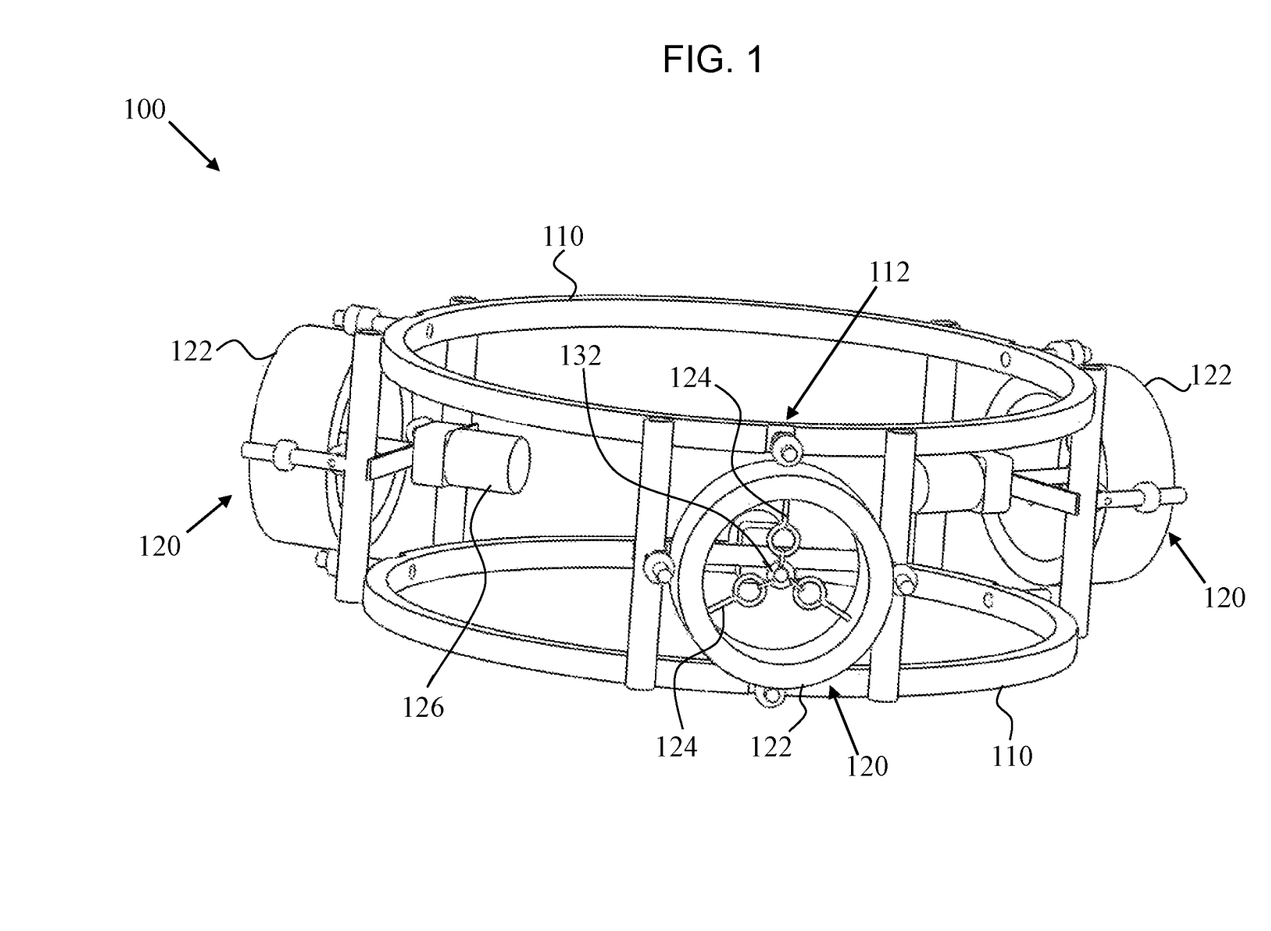
FIG. 1 illustrates a front perspective view of an inertial force polarizer apparatus according to an example embodiment of the present general inventive concept.
Figure 2:
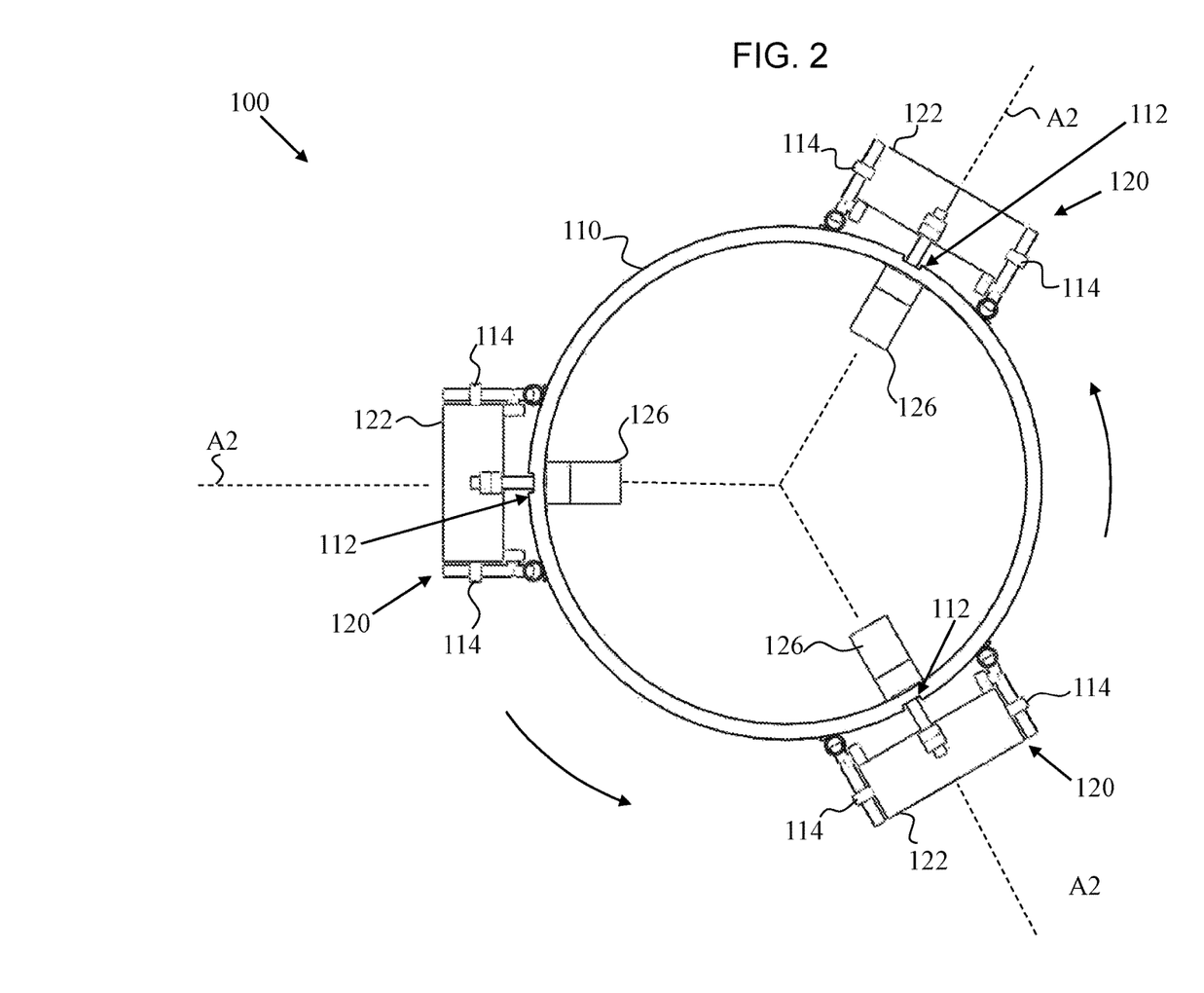
FIG. 2 is a top plan view of the inertial force polarizer apparatus illustrated in FIG. 1.
Figure 3:
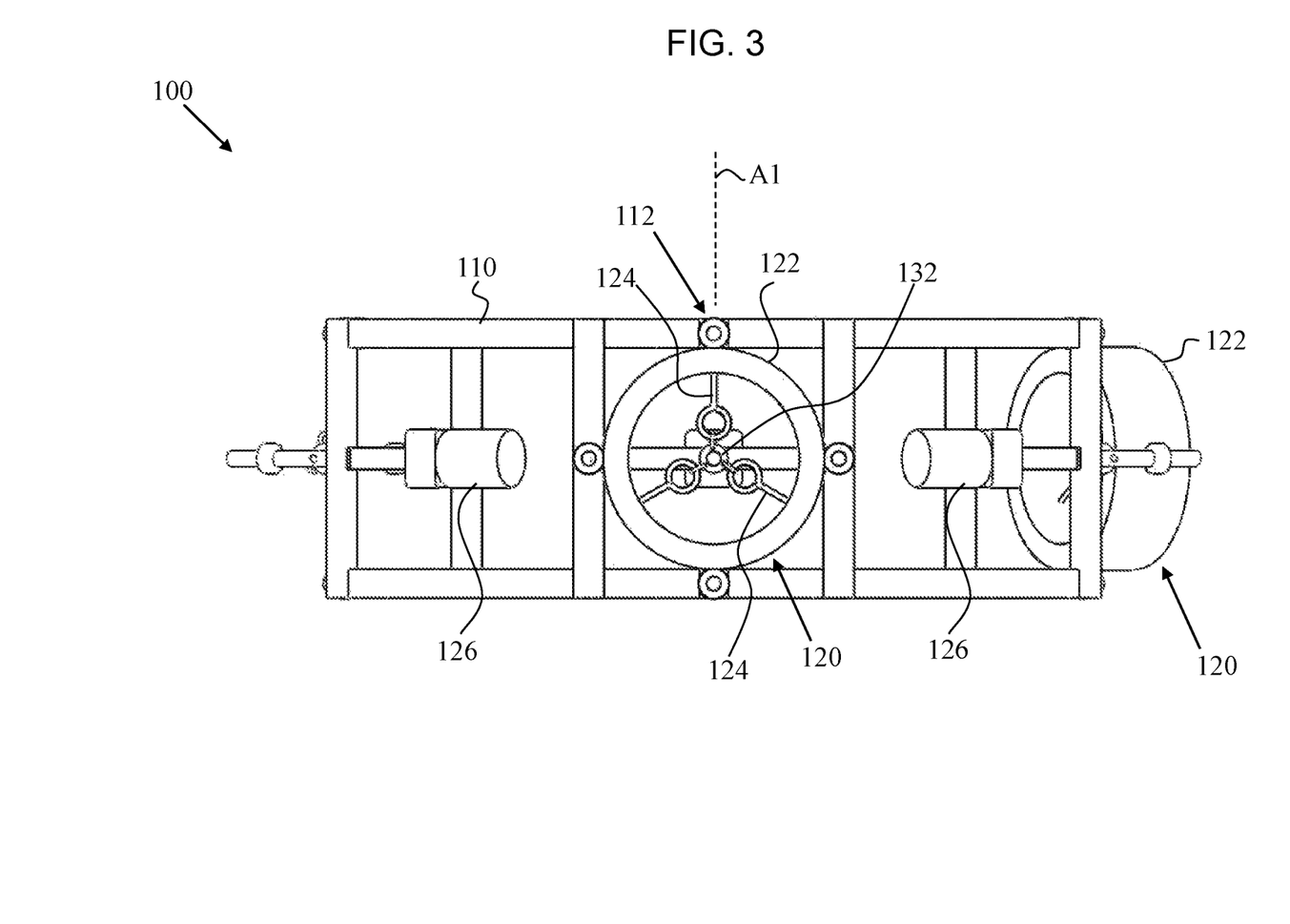
FIG. 3 is a side view of the inertial force polarizer apparatus illustrated in FIG. 1.
Figure 4:
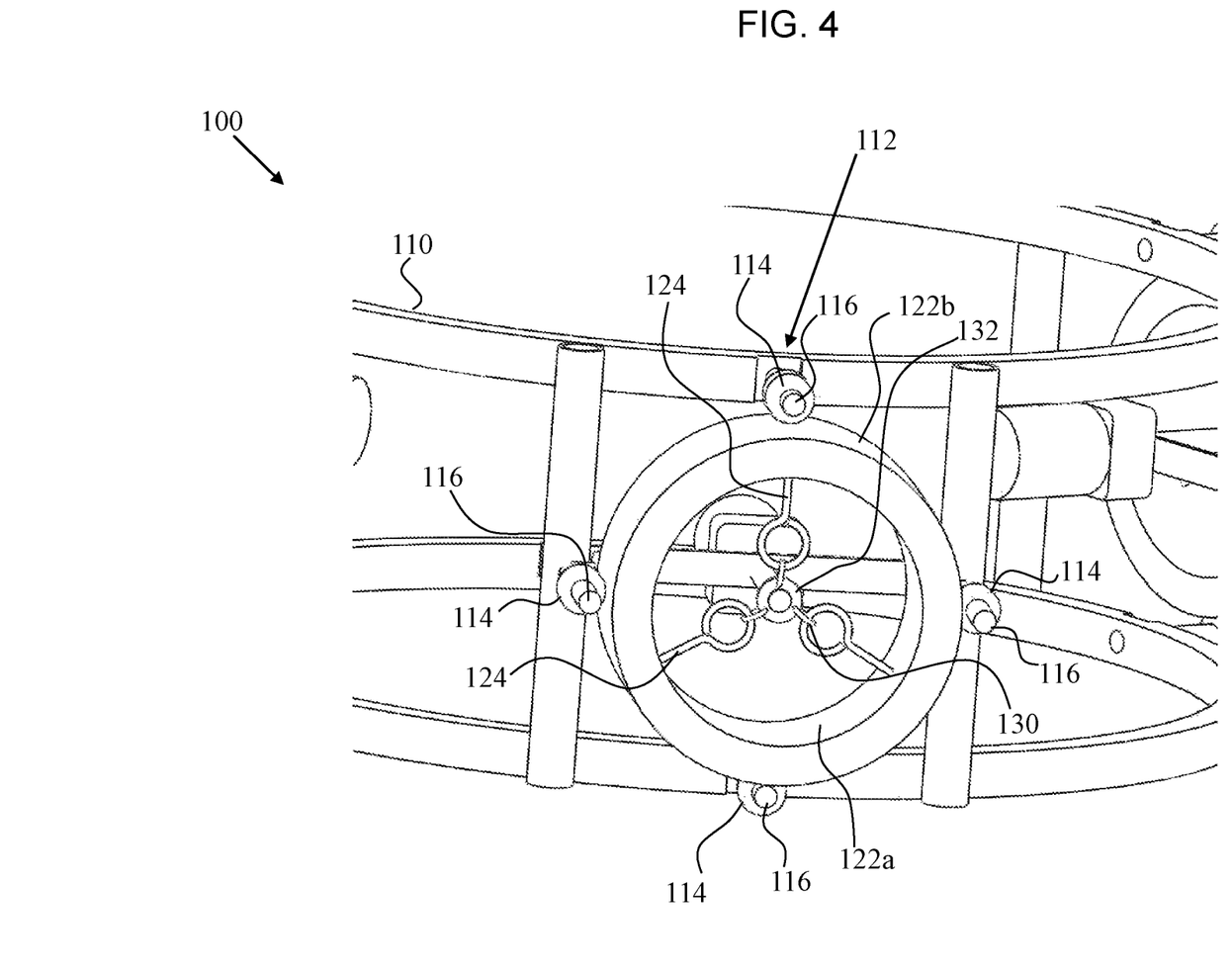
FIG. 4 is an enlarged front perspective view of the inertial force polarizer apparatus illustrated in FIG. 1.

FIG. 1 illustrates a front perspective view of an inertial force polarizer apparatus 100 according to an example embodiment of the present general inventive concept. FIG. 2 is a top plan view of the inertial force polarizer apparatus 100 illustrated in FIG. 1, FIG. 3 is a side view of the inertial force polarizer apparatus 100 illustrated in FIG. 1, and FIG. 4 is an enlarged front perspective view of the inertial force polarizer apparatus 100 illustrated in FIG. 1.

Referring now to FIGS. 1 through 4, the inertial force polarizer apparatus, designated generally as 100, is illustrated. In the present embodiment, the inertial force polarizer apparatus 100 includes a rotor frame member 110 having a plurality of rotor nests 112 that are equally spaced around the rotor frame member 110, and a plurality of rotor assemblies 120 that are located at the plurality of rotor nests 112 which are rotatably coupled to the rotor frame member 110.

In the present embodiment, the rotor frame member 110 is formed in a circular shape. However, the present general inventive is not limited thereto. That is, in alternative embodiments, the rotor frame member 110 may be formed in various other symmetrical shapes having one or more rotor assemblies 120 equally spaced around the symmetrically shaped rotor frame member 110.

Each rotor assembly 120 includes a shaftless rotor 122 having one or more attachment members 124 and a motor 126 having a rotatable shaft coupled to the one or more attachment members, the motor configured to drive rotation of the shaftless rotor about an axis, wherein a rotation of the shaftless rotor generates force which pushes the rotor frame member in an upward direction.

In the present embodiment, the inertial force polarizer apparatus 100 includes three rotor assemblies 120 that are disposed uniformly around a perimeter of the rotor frame member 110 in order to provide optimum stability. However, the present general inventive concept is not limited thereto.

In the present embodiment, as illustrated in FIG. 2, the three rotor assemblies 120 are disposed 120 degrees apart from each other. However, the present general inventive concept is not limited thereto. That is, in alternative embodiments, the inertial force polarizer apparatus 100 may include three or more rotor assemblies 120 that are disposed uniformly at equal angles around the rotor frame member 110.

In alternative embodiments, the inertial force polarizer apparatus 100 includes an elastic member 130 coupled between the one or more attachment members 124 and the rotatable shaft 128 of the motor 126.

In alternative embodiments, the inertial force polarizer apparatus 100 further includes a coupling member 132 coupled between the elastic member 130 and the rotatable shaft 128 of the motor 126. However, the present general inventive concept is not limited thereto.

In further embodiments, the inertial force polarizer apparatus 100, wherein the plurality of rotor nests 120 that are disposed uniformly about the rotor frame member 110.

In yet further embodiments, the inertial force polarizer apparatus 100 includes one or more support bearings 114 configured to rotatably support the shaftless rotor 122.

Figure 5:
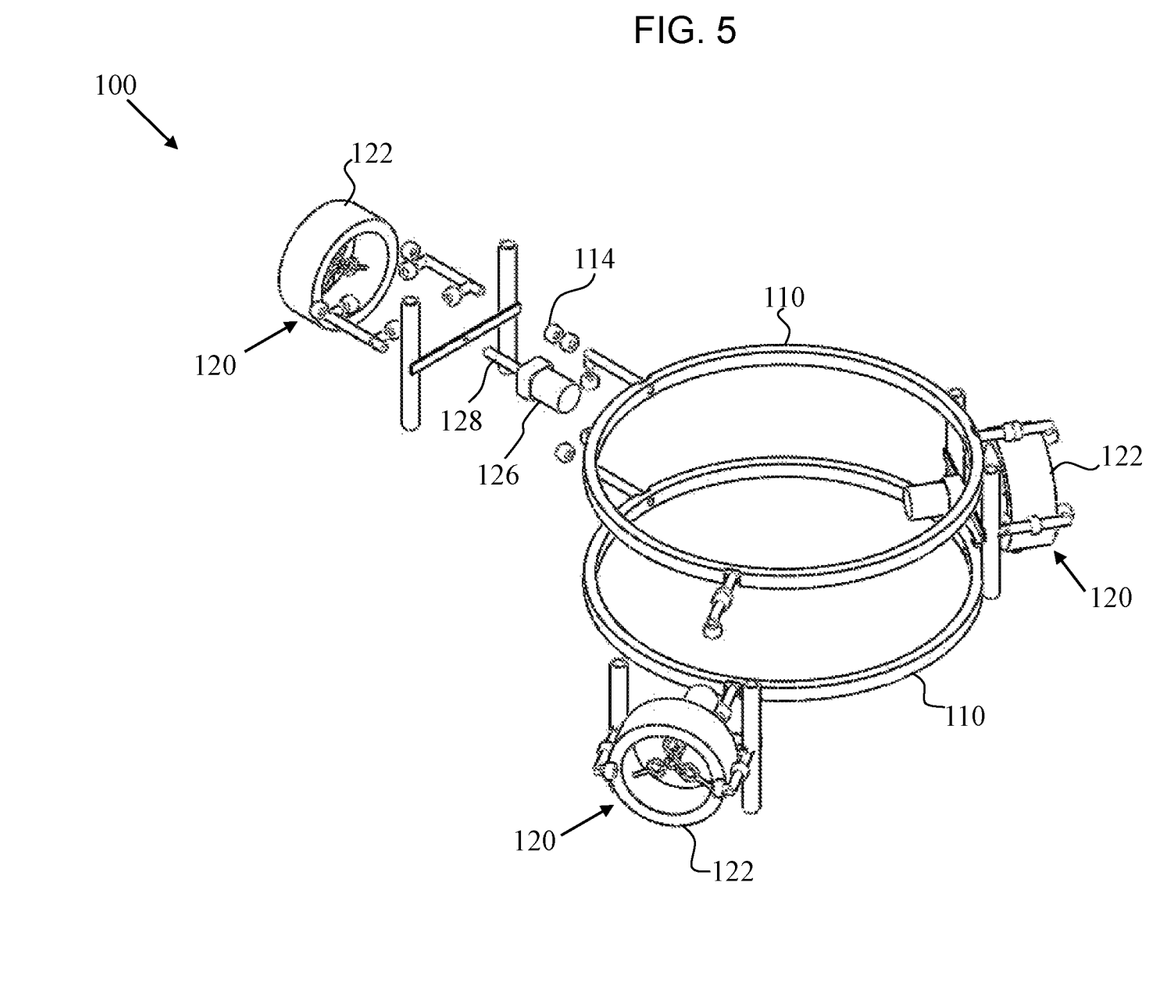
FIG. 5 is a partial exploded assembly view of the inertial force polarizer apparatus illustrated in FIG. 1.
Figure 6:
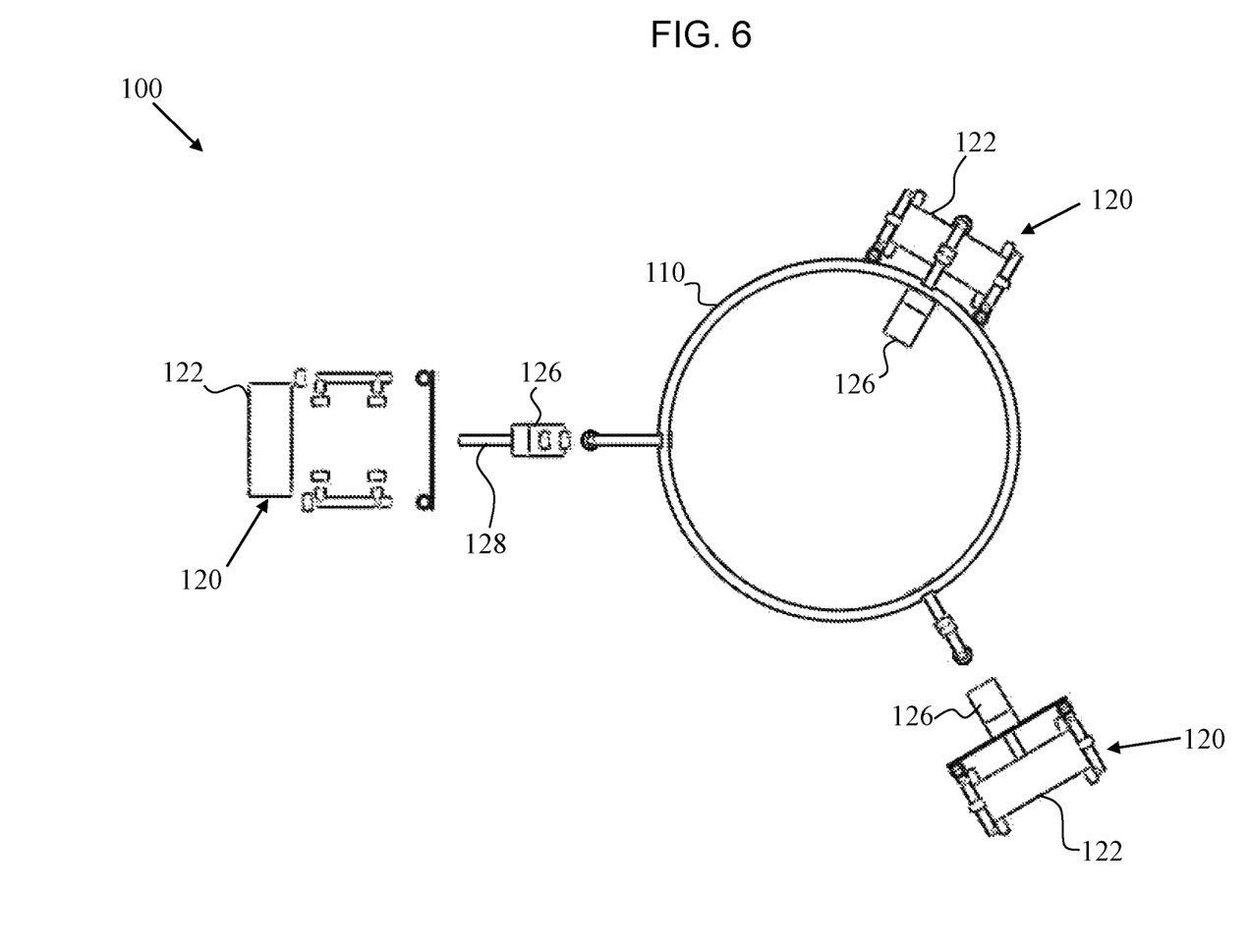
FIG. 6 is a top plan view of the inertial force polarizer apparatus illustrated in FIG. 5.
Figure 7:
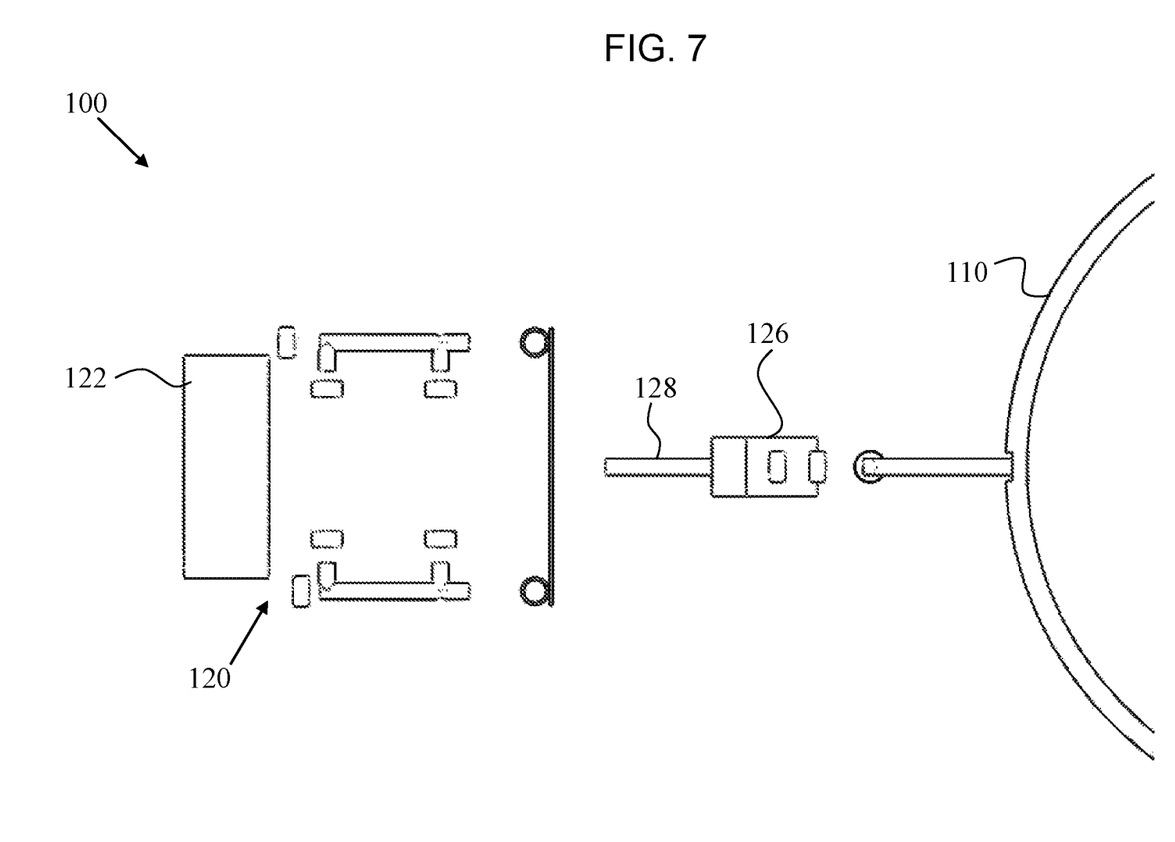
FIG. 7 is an enlarged top plan view of the inertial force polarizer apparatus illustrated in FIG. 6.
Figure 8:
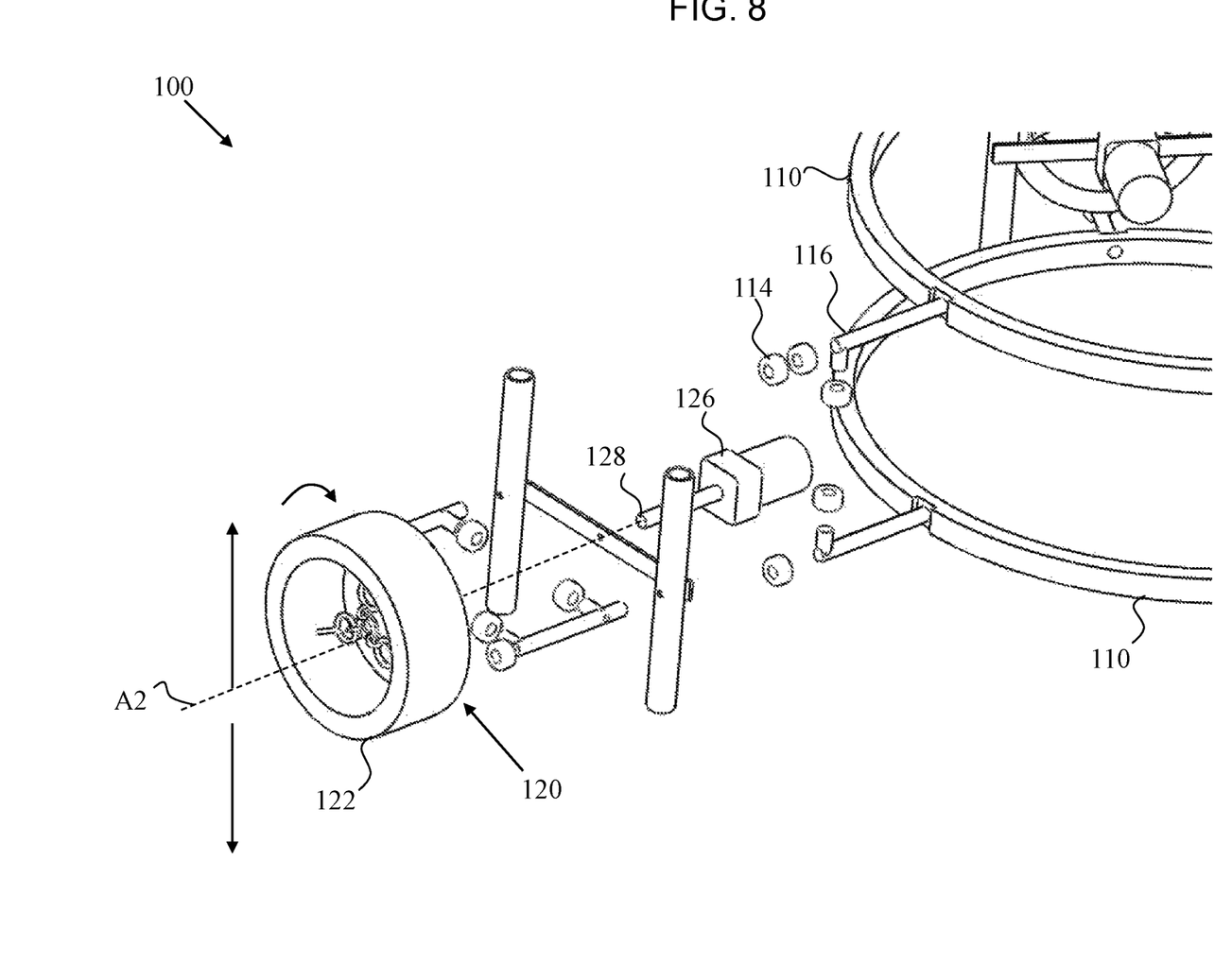
FIG. 8 is a perspective view of the inertial force polarizer apparatus illustrated in FIG. 7.
Figure 9:
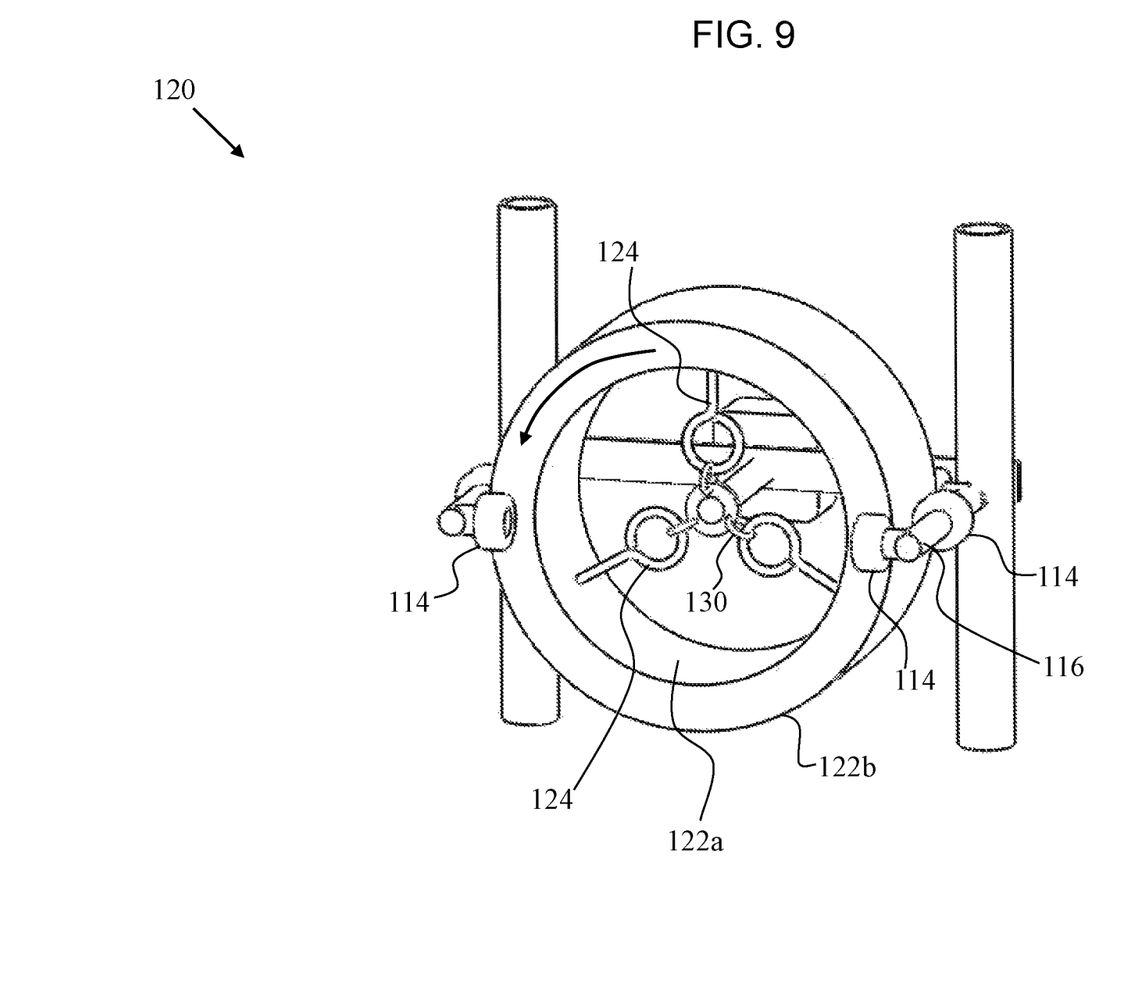
FIG. 9 illustrates a front perspective view of a rotor assembly according to an example embodiment of the present general inventive concept.
Figure 10:
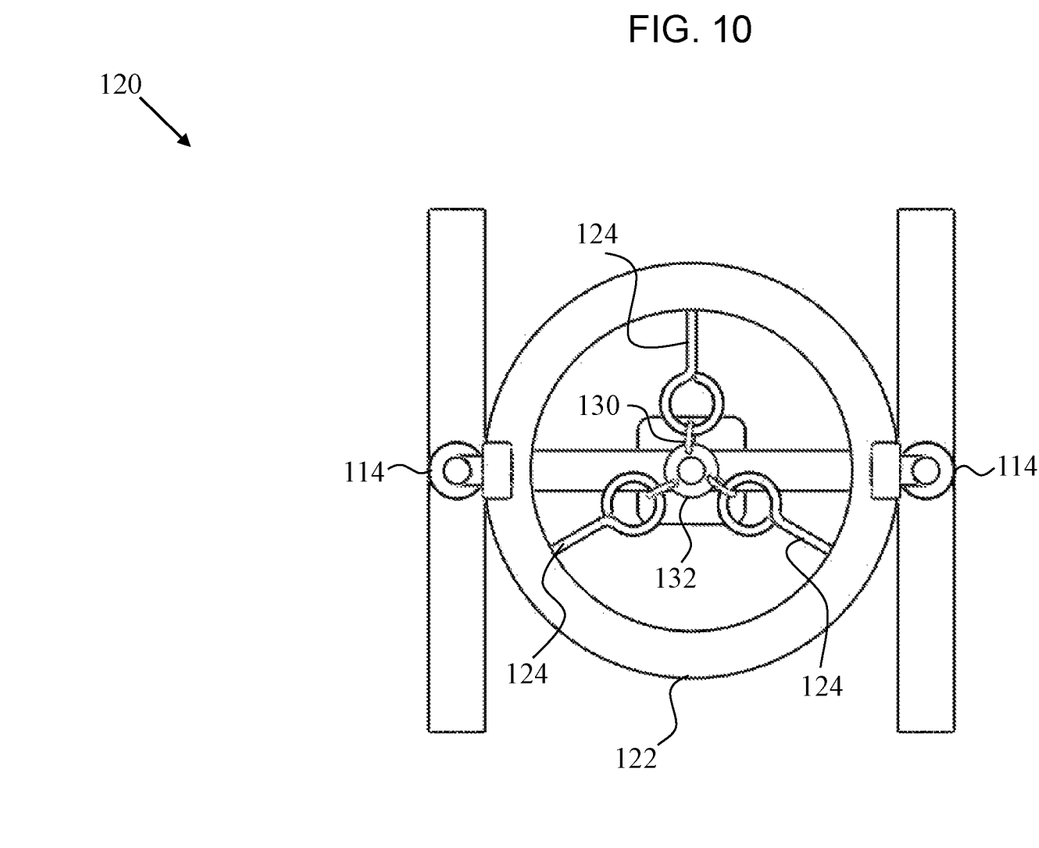
FIG. 10 illustrates a front view of the rotor assembly illustrated in FIG. 9.
Figure 11:
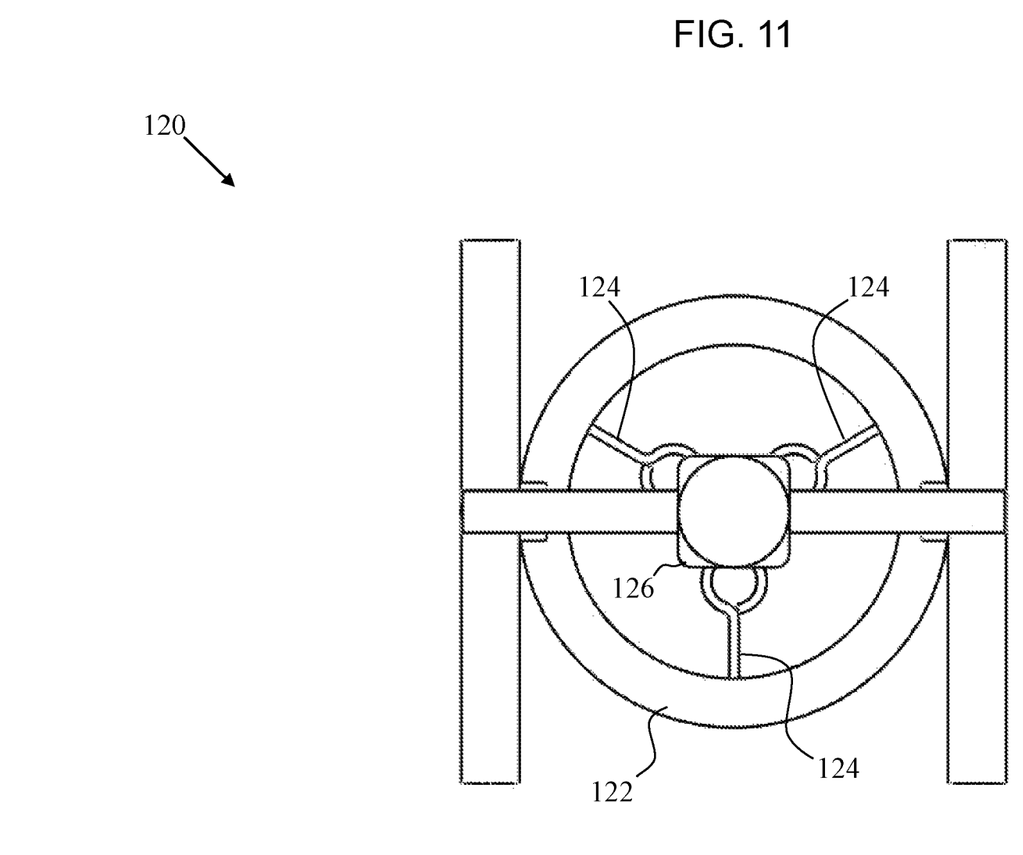
FIG. 11 illustrates a back view of the rotor assembly illustrated in FIG. 9.
Figure 12:
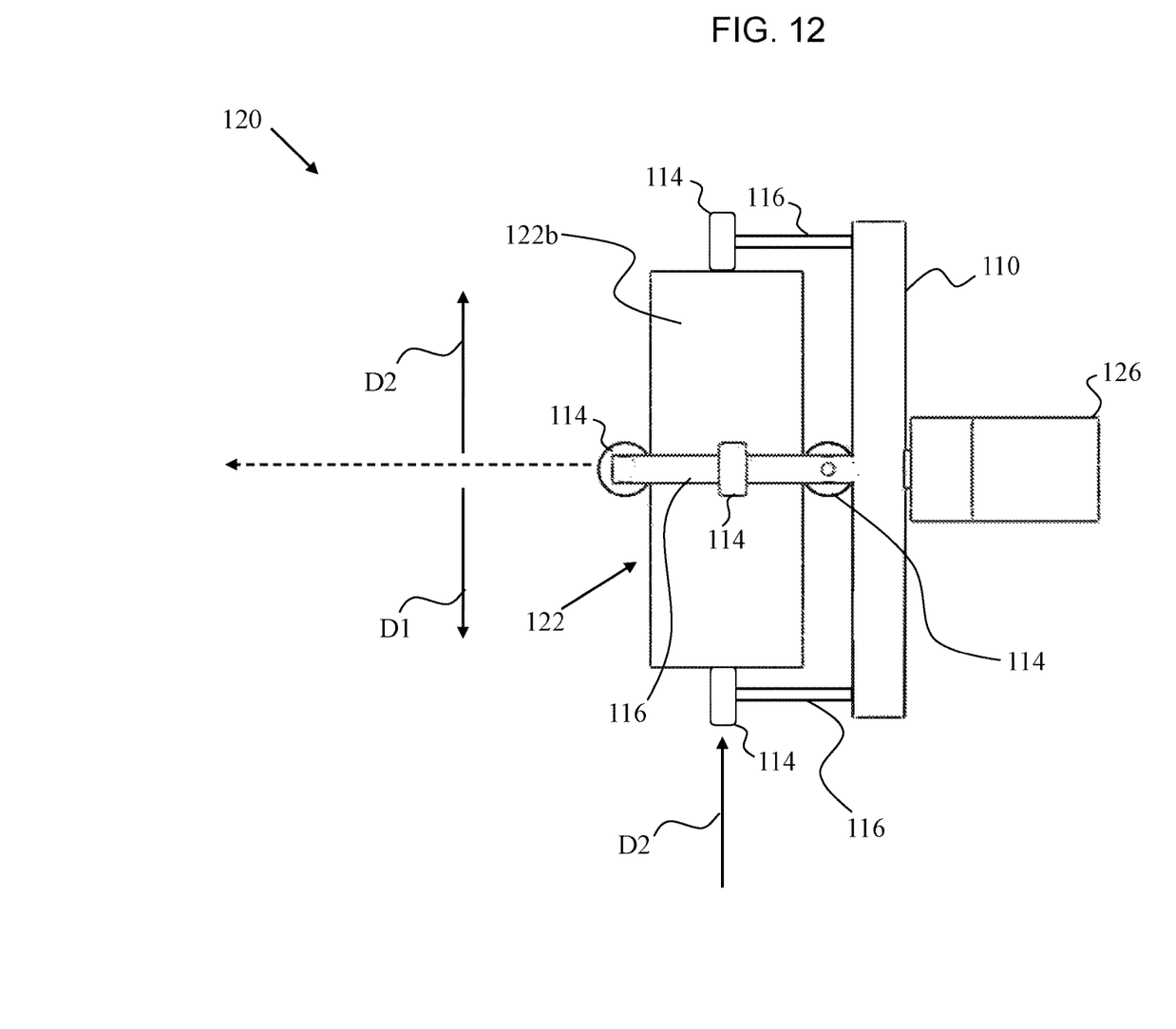
FIG. 12 illustrates a side view of the rotor assembly illustrated in FIG. 9.

FIG. 5 is a partial exploded assembly view of the inertial force polarizer apparatus 100 illustrated in FIG. 1, FIG. 6 is a top plan view of the inertial force polarizer apparatus 100 illustrated in FIG. 5, and FIG. 7 is an enlarged top plan view of the inertial force polarizer apparatus 100 illustrated in FIG. 6. FIG. 8 is a perspective view of the inertial force polarizer apparatus 100 illustrated in FIG. 7, FIG. 9 illustrates a front perspective view of a rotor assembly 120 according to an example embodiment of the present general inventive concept, and FIG. 10 illustrates a front view of the rotor assembly 120 illustrated in FIG. 9. FIG. 11 illustrates a back view of the rotor assembly 120 illustrated in FIG. 9 and FIG. 12 illustrates a side view of the rotor assembly 120 illustrated in FIG. 9.

Referring now to FIGS. 5 through 12, each rotor assembly 120 of the inertial force polarizer apparatus 100 includes a shaftless rotor 122 formed of a metal and having one or more attachment members 124 coupled to an inner surface 122a of the rotor 122 and a motor 126 having a rotatable shaft 128 coupled to the one or more attachment members 124 via an elastic member 130. In the present embodiment, the elastic member 130 is formed of an elastic material, such as rubber or the like. However, the present general inventive concept is not limited thereto.

In the present embodiment, the elastic member 130 elastically transfers the rotational force generated by the motor 126 to the shaftless rotor 122. The motor 126 is configured to drive a rotation of the shaftless rotor 122 about a rotational axis A2 centered about each motor 126. As such, the rotation of the shaftless rotor 122 generates angular momentum internal to the shaftless rotor 122.

In the present embodiment, the motor 126 is configured to drive rotation of the shaftless rotor 122 to between about 3000 to about 9000 rpm. However, the present general inventive concept is not limited thereto.

In the present embodiment, referring to FIG. 8, the plurality of rotor nests 112 include one or more support bearings 114 disposed on support arms 116 of the frame member 110 which are configured to support the outer surface 122b of the shaftless rotor 122.

Referring to FIG. 12, the support bearings 114 and the support arms 116 allow the rotor 122 to rotate freely while allowing energy built up within each of the rotors 122 to act upon or push the frame member 110 in an upward direction D2.

Figure 13:
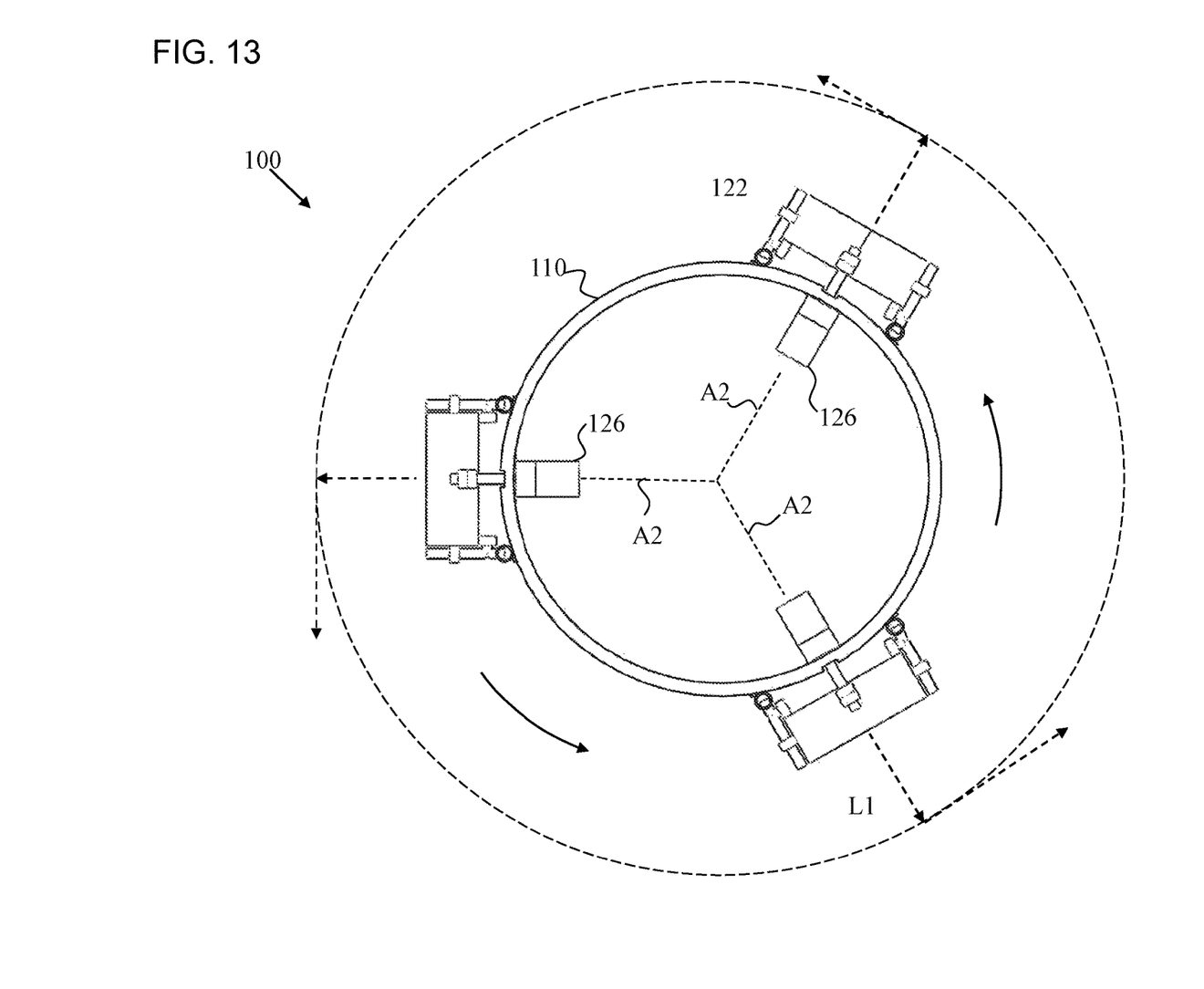
FIG. 13 illustrates a top plan view of the inertial force polarizer apparatus when rotated to create artificial precession.
Figure 14:
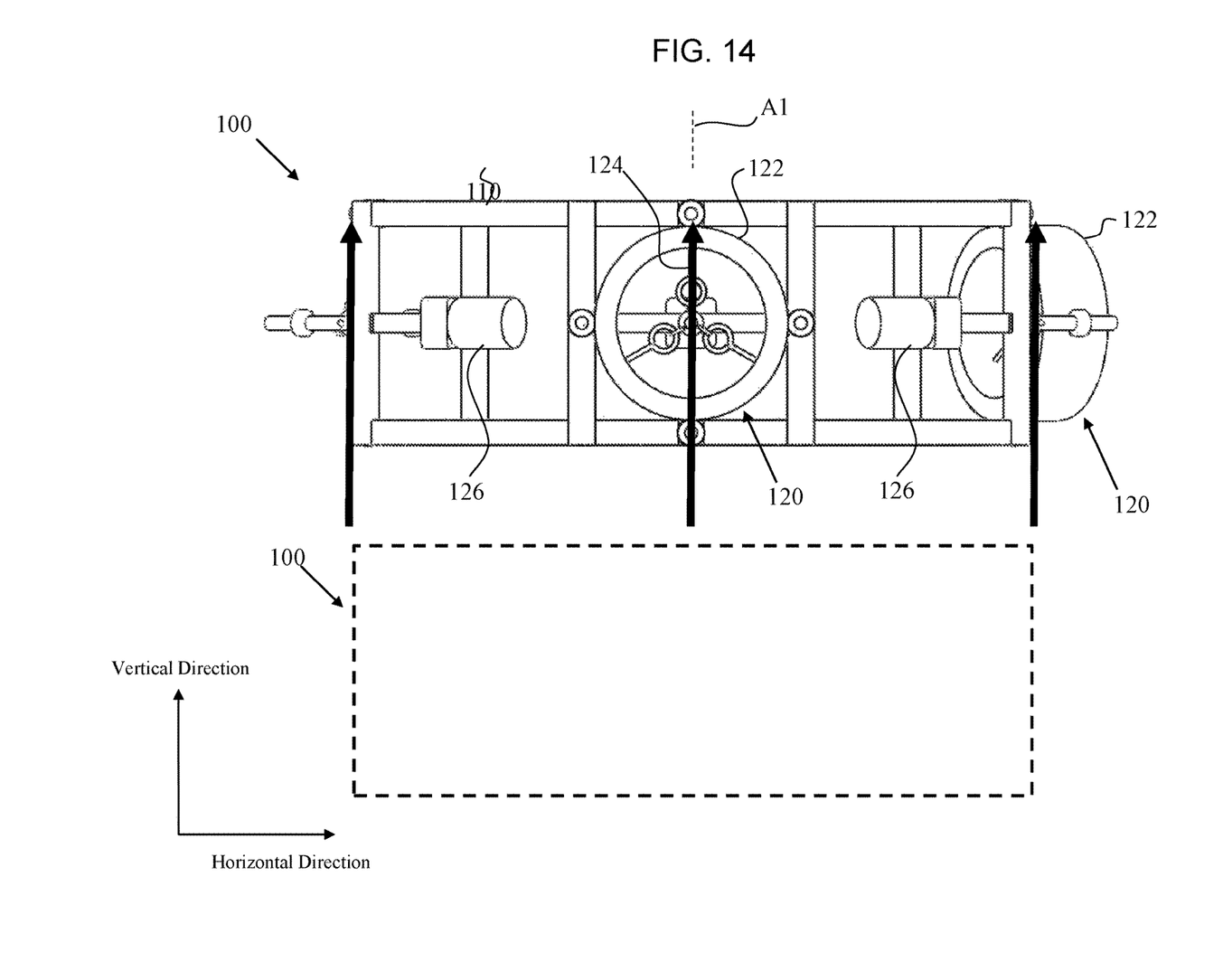
FIG. 14 illustrates side view of the inertial force polarizer apparatus when the rotors are rotated around the axis A2 and the inertial force polarizer apparatus is rotated around axis A1.

FIG. 13 illustrates a top plan view of the inertial force polarizer apparatus when rotated to create artificial precession and FIG. 14 illustrates side view of the inertial force polarizer apparatus when the rotors are rotated along A2 and the inertial force polarizer apparatus is rotated around A1.

The inertial force polarizer apparatus according to the present invention includes a rotor frame member comprising a plurality of rotor nests, a plurality of rotor assemblies rotatably mounted to the rotor frame member, each rotor assembly including a shaftless rotor having one or more attachment members and a motor having a rotatable shaft coupled to the one or more attachment members, the motor configured to drive rotation of the shaftless rotor about an axis, wherein a rotation of the shaftless rotor generates an inertia on the rotor frame member.

As such, as the shaftless rotor is rotated from about 3000 rpm to about 9000 rpm and an artificial precession is created by rotating the entire inertial force polarizer apparatus about an axis of the rotor frame member, a force counter to gravitational force (i.e., lift) is created due to a gyroscopic effect.

Referring now to FIGS. 13 and 14, when the shaftless rotor 122 is rotated to about 3000 to about 9000 rpm, the charged particles within the shaftless rotor 122 are shifted to a higher energy state, creating a potential. This energy is released once artificial precession is initiated by rotating the inertial force polarizer apparatus 100 about the axis A1.

The rotor frame member 110 further guides and maintains the spin of the shaftless rotors 122 necessary to produce guided precession. In addition, the circular shaped multi-rotor frame member 110 rests above the plurality of rotor assemblies 120 that are rotatably coupled to the rotor frame member 120 in order to allow the gyroscopic precession to effectively push the inertial force polarizer apparatus 100 in an upward direction.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents. It should also be appreciated that the exemplary embodiment or exemplary embodiments are only examples, and are not intended to limit the scope, applicability, or configuration or the invention in any way. Rather, the foregoing Detailed Description will provide to those skilled in the art with a convenient road map for implementing an exemplary embodiment of the present invention.

What is claimed is:

1. An inertial force polarizer apparatus configured to generate an inertial force created by angular momentum within a rotating solid object, comprising:
   a rotor frame member comprising a plurality of rotor nests;
   a plurality of rotor assemblies rotatably mounted to the rotor frame member, each rotor assembly comprising:
      a shaftless rotor having one or more attachment members; and
      a motor having a rotatable shaft coupled to the one or more attachment members via an elastic member, the motor configured to drive rotation of the shaftless rotor about an axis,
   wherein a rotation of the shaftless rotor generates an inertia on the rotor frame member.

2. The inertial force polarizer apparatus of claim 1, wherein the elastic member is coupled between the one or more attachment members and the rotatable shaft.

3. The inertial force polarizer apparatus of claim 2, further comprising a coupling member coupled between the elastic member and the rotatable shaft.

4. The inertial force polarizer apparatus of claim 1, wherein the plurality of rotor nests are disposed uniformly about the rotor frame member.

5. The inertial force polarizer apparatus of claim 1, further comprising one or more support bearings configured to support the shaftless rotor.

6. The inertial force polarizer apparatus of claim 5, wherein the inertia on the rotor frame member arises from internally propagated forces generated by the rotation of the shaftless rotor as transferred to the rotor frame member via the support bearings.

7. A rotor assembly configured to generate an inertial force created by angular momentum, comprising:
   a shaftless rotor supported by a plurality of attachment members rather than a central axle;
   a motor having a rotatable shaft, the rotatable shaft being coupled to the attachment members of the shaftless rotor via an elastic member, the motor configured to drive rotation of the shaftless rotor about a central axis of the shaftless rotor; and
   a plurality of support bearings contacting an outer surface of the shaftless rotor in a manner to support the shaftless rotor when rotating,
   wherein, a rotation of the shaftless rotor generates an inertial force through the support bearings via the attachment members and the outer surface of the shaftless rotor.

8. The rotor assembly of claim 7, wherein the elastic member is coupled between the attachment members and the rotatable shaft of the motor.

9. The rotor assembly of claim 8, further comprising a coupling member coupled between the elastic member and the rotatable shaft of the motor.

10. The rotor assembly of claim 7, wherein support bearings are attached to a rotor frame member that supports the shaftless rotor during rotations by way of the support bearings.

11. The rotor assembly of claim 10, wherein the rotor assembly comprises a first rotor assembly supported by the rotor frame member and the rotor assembly supports at least one other rotor assembly.

* * * * *